US012775135B2

(12) United States Patent
Okuda et al.

(10) Patent No.: US 12,775,135 B2
(45) Date of Patent: Oct. 27, 2026

(54) DISPLAY DEVICE

(71) Applicant: Japan Display Inc., Tokyo (JP)

(72) Inventors: Koichi Okuda, Tokyo (JP); Shinichi Komura, Tokyo (JP); Jin Hirosawa, Tokyo (JP); Hiroaki Kijima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/417,349

(22) Filed: Dec. 12, 2025

(65) Prior Publication Data

US 2026/0169214 A1 Jun. 18, 2026

(30) Foreign Application Priority Data

Dec. 13, 2024 (JP) ................................ 2024-218436

(51) Int. Cl.
*F21V 8/00* (2006.01)

(52) U.S. Cl.
CPC ......... *G02B 6/0076* (2013.01); *G02B 6/0068* (2013.01)

(58) Field of Classification Search
CPC .... G02B 6/002; G02B 6/0045; G02B 6/0046; G02B 6/0048; G02B 6/0053; G02B 6/0055; G02B 6/0058; G02B 6/006; G02B 6/0061; G02B 6/0068; G02B 6/007; G02B 27/017; G02B 27/0172
USPC ......... 362/616, 623, 625, 626, 628; 359/630
See application file for complete search history.

(56) References Cited

U.S. PATENT DOCUMENTS

2003/0063456 A1* 4/2003 Katahira .............. G02B 6/0046 362/616
2012/0081920 A1* 4/2012 Ie ......................... G02B 6/0076 362/609
2013/0286686 A1* 10/2013 Kettunen ......... B29D 11/00865 362/628
2013/0322114 A1* 12/2013 Nishitani ............. G02B 6/0018 362/609
2023/0128012 A1 4/2023 Komura et al.

* cited by examiner

*Primary Examiner* — Thomas M Sember
(74) *Attorney, Agent, or Firm* — XSENSUS LLP

(57) ABSTRACT

According to an embodiment, a display device includes an illumination device, and a display panel. The illumination device includes a first light guide, a second light guide, and a second reflector. The first light guide and the second light guide respectively include first short edges, second short edges, third short edges, and fourth short edges. The second reflector include first segments, second segments, third segments, and fourth segments. The first segments face the first short edges, and the second segments face the second short edges. The third segments face the third short edges, and the fourth segments face the second short edges.

4 Claims, 8 Drawing Sheets

DISPLAY DEVICE

CROSS-REFERENCE TO RELATED APPLICATIONS

This application is based upon and claims the benefit of priority from Japanese Patent Application No. 2024-218436, filed Dec. 13, 2024, the entire contents of which are incorporated herein by reference.

FIELD

Embodiments described herein relate generally to a display device.

BACKGROUND

In recent years, there has been a lot of attention paid to technology that uses a display device called a head mounted display (HMD) that is mounted on the user's head to provide virtual reality (VR), for example.

DETAILED DESCRIPTION

Figure 1:
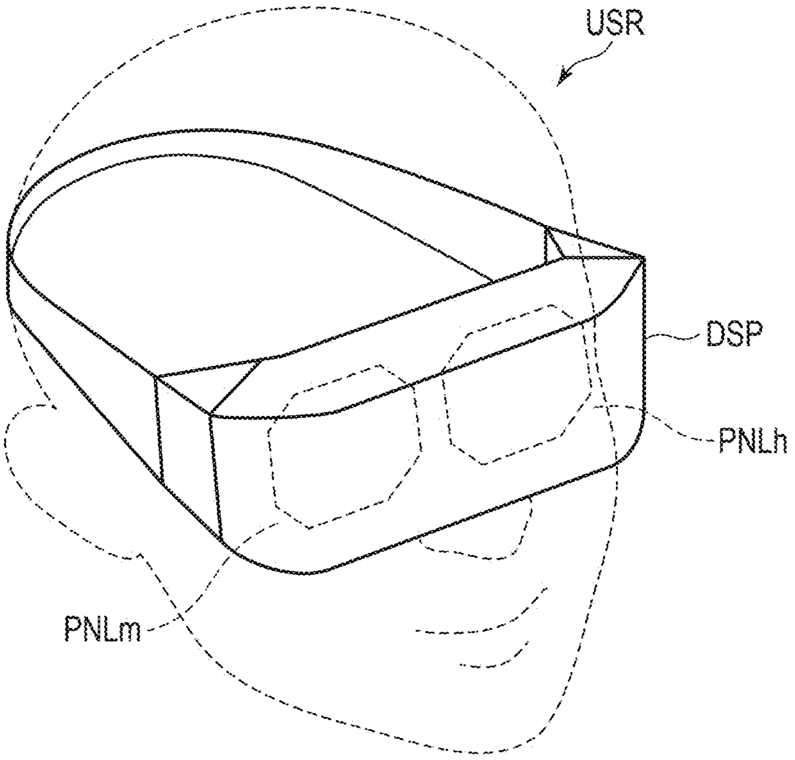
FIG. 1 is a perspective view showing an example of the external appearance of a display device according to this embodiment.

In general, according to one embodiment, a display device comprises an illumination device; and a display panel provided on the illumination device, wherein the illumination device comprises:

a first light guide having a rectangular shape extending along a first direction and a second direction intersecting the first direction, in which corners thereof are cut out, and including a first edge and a second edge extending along the second direction, and a third edge and a fourth edge extending along the first direction;

a second light guide disposed on the first light guide, having a rectangular shape extending along the first direction and the second direction in which corners are cut out, and having a fifth edge and a sixth edge extending along the second direction, and a seventh edge and an eighth edge extending along the first direction;

a plurality of light source elements disposed to face the fifth edge of the second light guide;

a first reflector disposed below the first light guide;

an optical sheet disposed on the second light guide; and a second reflector disposed to face the second edge of the first light guide and the sixth edge of the second light guide, wherein the first light guide has a cross-sectional shape of a first trapezoid in which a lower edge thereof is shorter than an upper edge, the second light guide has a cross-sectional shape of a second trapezoid in which an upper edge thereof is shorter than a lower edge, the first light guide and the second light guide respectively include first short edges each extending in the first direction and second short edges each extending in the second direction, which are arranged alternately with each other, between the third edge and the second edge of the first light guide and between the seventh edge and the sixth edge of the second light guide, the first light guide and the second light guide respectively include third short edges extending in the first direction and fourth short edges extending in the second direction, which are arranged alternately with each other, between the fourth edge and the second edge of the first light guide and between the eighth edge and the sixth edge of the second light guide, the second reflector include first segments each extending in the first direction and second segments each extending in the second direction, which are arranged alternately with each other, and third segments each extending in the first direction and fourth segments each extending in the second direction, which are arranged alternately with each other, the first segments face the first short edges, the second segments face the second short edges, and the third segments face the third short edges, and the fourth segments face the second short edges.

An object of this embodiment is to provide a to provide an illumination device that emits light with a uniform luminance distribution, and a display device that emits image light with a uniform luminance distribution by being illuminated by the illumination light.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below. Note that the first direction X, the second direction Y and the third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the optical control element on a tip side of the arrow in the third direction Z. Here, viewing from this observation position toward the X-Y plane defined by the first direction X and the second direction Y is referred to as plan view. Viewing a cross-section of the display device in the X-Z plane defined by the first direction X and the third direction Z or in the Y-Z plane defined by the second direction Y and the third direction Z is referred to as cross-sectional view.

Embodiment

FIG. 1 is a perspective view showing an example of the appearance of the display device of this embodiment. In this embodiment, the display device includes a head mounted display (HMD) that is mounted on the user's head when used. Such a display device is used to provide, for example, virtual reality (VR) to the user wearing the display device on his/her head.

As shown in FIG. 1, the display device HMD comprises a display panel PNLh and a display panel PNLm. Note that the display panel PNLh and the display panel PNLm may as well be referred to as the first display panel and the second display panel, respectively. The display panel PNLh and the display panel PNLm are display panels independent from each other.

The display panel PNLh and the display panel PNLm are respectively arranged so that they are positioned in front of the left and right eyes of the user USR when the user USR wears the display device HMD on his/her head. In this embodiment, it is assumed that the display panel PNLh and the display panel PNLm are liquid crystal display panels with a liquid crystal layer.

Figure 2:
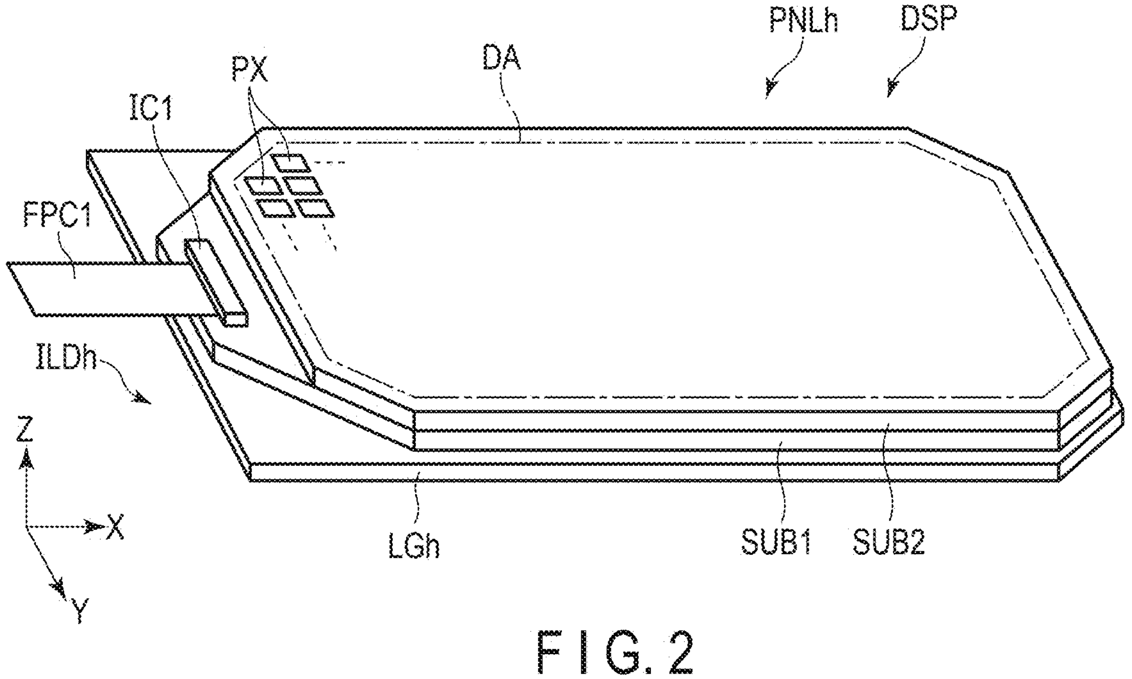
FIG. 2 is a perspective view schematically showing a configuration of the display device according to this embodiment.

FIG. 2 is a perspective view schematically showing a configuration of the display panel provided in the display device of this embodiment. Here, the configuration of the display panel PNLh will be mainly explained.

The display panel PNLh shown in FIG. 2 comprises a first substrate SUB1 and a second substrate SUB2 facing the first substrate SUB1. The display panel PNLh also includes a display area DA that displays images. Further, the display panel PNLh comprises a plurality of pixels PX arranged in a matrix in the display area DA, for example.

In addition, the display panel PNLh comprises a drive IC chip IC1 that drives the display panel PNLh and a flexible printed circuit board FPC1 that transmits control signals to the display panel PNLh. The flexible printed circuit board FPC1 is connected to a control module (host computer) that controls the operation of the display device DSP.

In the example shown in FIG. 2, the first substrate SUB1 and the second substrate SUB2 each have long sides that run along the first direction X and short sides that run along the second direction Y. The first substrate SUB1 and the second substrate SUB2 each have an octagonal shape in a plan view. This shape can also be described as a shape in which the corners of a rectangle are cut off. The shape of the display panel PNLh in a plan view is an octagonal shape.

Note that the shapes of the display panel PNLh are not limited to that of this case, but it suffices if they have a polygonal shape. The shape of the display panel may be any shape as long as it can prevent it from being hit by the nose of the user USR, which will be described later, that is, a shape whose corner portion close to the nose of the user USR is cut off.

In the example shown in FIG. 2, the shape of the display panel PNLh is described. The display panel PNLm has a shape that is line-symmetrical with respect to the second direction Y relative to the display panel PNLh. Note that the configuration of the display panel PNLm is similar with that of the display panel PNLh except for the point that it has a shape that is line-symmetrical with respect to the second direction Y.

Below the display panel PNLh, an illumination device ILDh is provided. In the example shown in FIG. 2, only the light guide LGh of the illumination device ILDh is illustrated. The light guide LGh has a rectangle shape extending along the first direction X and the second direction Y, in which parts of corners are cut out.

Figure 3:
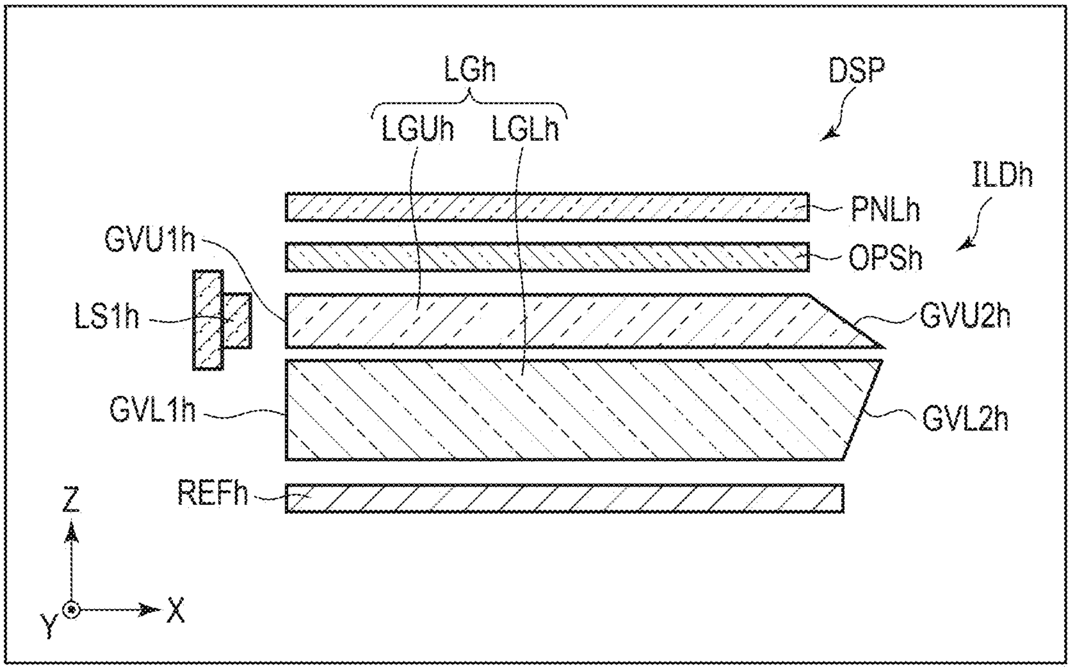
FIG. 3 is a cross-sectional view schematically showing the configuration of the display device.

FIG. 3 is a cross-sectional view schematically showing a configuration of the display device. The display device DSP shown in FIG. 3 comprises an illumination device ILDh and a display panel PNLh. The illumination device ILDh comprises a reflector REFh, a light guide LGLh, a light guide LGUh, an optical sheet OPSh, and a light source element LS1*h*. The reflector REFh, the light guide LGLh, the light guide LGUh, and the optical sheet OPSh are stacked in this order.

The light guide LGLh and the light guide LGUh constitute the light guide LGh shown in FIG. 2. The display panel PNLh is provided on top of the illumination device ILDh.

In FIG. 3, of the edges of the light guide LGLh, the edge on the left side of the page is designated as an edge GVL1*h*, and the right edge is designated as an edge GVL2*h*. Of the edges of the light guide LGLh, the edge on the left side of the page is designated as an edge GVU1*h*, and the right edge is designated as an edge GVU2*h*.

The light guide LGLh has a cross-sectional shape of a trapezoid in which a lower edge thereof is shorter than an upper edge. The left leg of the trapezoidal shape, that is, the edge GVL1*h*, extends along the third direction Z. The right leg of the trapezoidal shape, that is, the edge GVL2*h*, extends at an angle to the third direction Z.

The light guide LGUh has a cross-sectional shape of a trapezoid in which the lower edge is longer than the upper edge. The left edge of the trapezoidal shape, that is, the edge GVU1*h*, extends along the third direction Z. The right edge of the trapezoidal shape, that is, the edge GVU2*h*, extends at an angle to the third direction Z.

The light source element LS1*h* is provided to face the edge GVU1*h* of the light guide LGUh. Light emitted from the light source element LS1*h* enters the light guide LGUh from the edge GVU1*h* thereof.

For the light source element LS1*h*, a laser light source (laser diode), such as a semiconductor laser that emits laser light can be used. The laser light may be diverged light having a spread centered on the irradiation direction, or it may be polarized laser light.

Note that although the edge GVU1*h* and the edge GVL1*h* are referred to as edges, they are actually planes parallel to the Y-Z plane. The edge GVU2*h* and the edge GVL2*h* are actually planes inclined at an angle to the Y-Z plane.

On the main surfaces of the reflector REFh, the light guide LGLh, the light guide LGUh, and the optical sheet OPSh, multiple protruding portions (which may as well be referred to as prisms) are provided.

Figure 4:
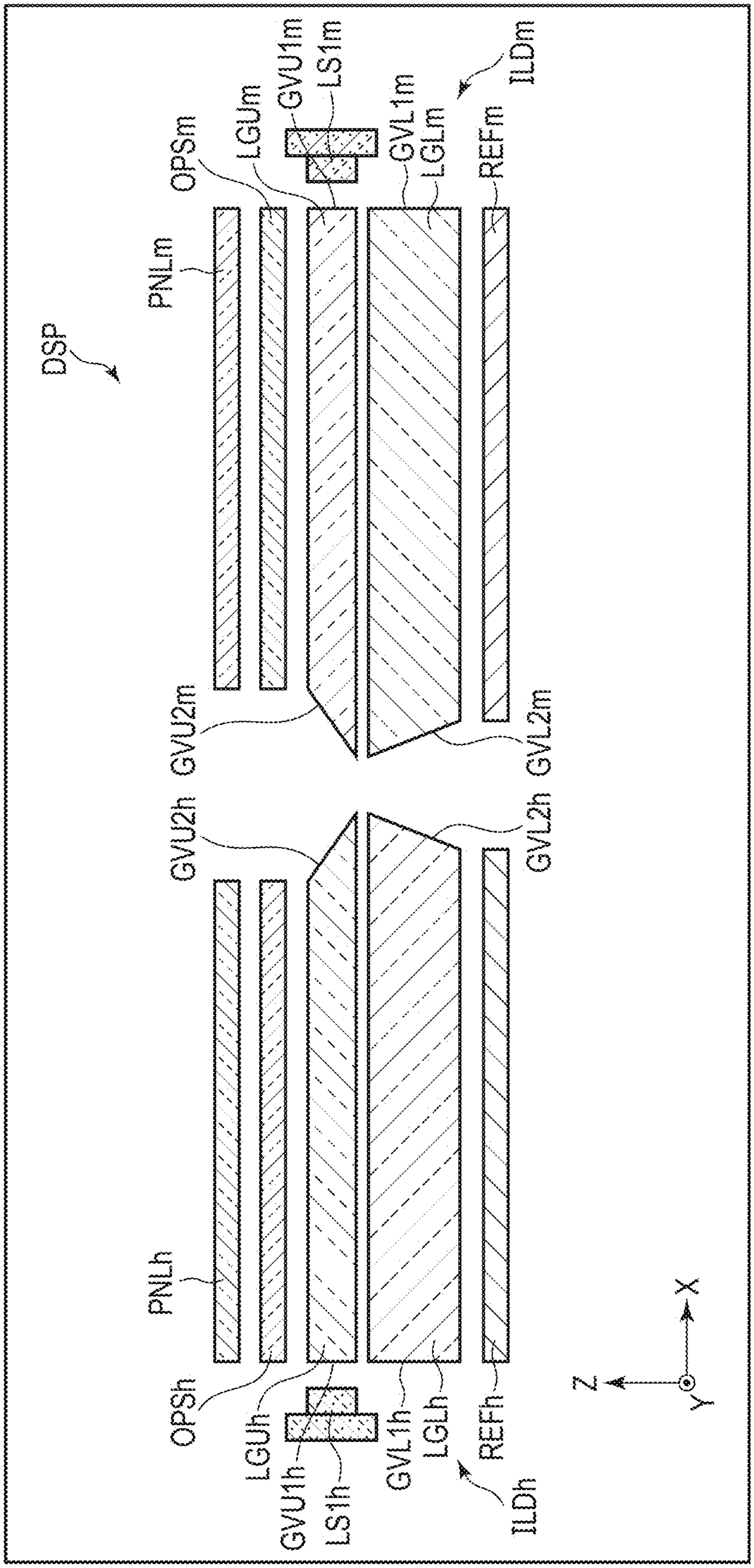
FIG. 4 is a cross-sectional view illustrating a detailed configuration of an illumination device.

FIG. 4 is a cross-sectional view illustrating a more detailed configuration of the illumination device. The display device DSP shown in FIG. 4 comprises an illumination device ILDh for the left eye, a display panel PNLh for the left eye, an illumination device ILDm for the right eye, and a display panel PNLm for the right eye. The display panel PNLh is provided on the illumination device ILDh. The display panel PNLm is provided on the illumination device ILDm.

The illumination device ILDh and the display panel PNLh have respective configurations similar with those of the illumination device ILDh and the display panel PNLh shown in FIG. 3. The illumination device ILDm and the display panel PNLm are provided at symmetrical positions with respect to the Y-Z plane relative to the illumination device ILDh and display panel PNLh.

The illumination device ILDm comprises a reflector REFm, a light guide LGLm, a light guide LGUm, an optical sheet OPSm, and a light source element LS1*m*. The reflector REFm, the light guide LGLm, the light guide LGUm, and the optical sheet OPSm are stacked in this order.

The light guide LGUm has an edge GVU1*m* and an edge GVU2*m*. The edge GVU1*m* is located on the right side on the page and faces the light source element LS1*m*. The edge GVU2*m* is located on the left side of the page and faces the edge GVU2*h* of the light guide LGUh.

The light guide LGLm has an edge GVL1*m* and an edge GVL2*m*. The edge GVL1*m* is located on the right side of the page and aligned with the edge GVU1*m* of the light guide LGUm along the third direction Z. The edge GVL2*m* is located on the left side of the page and faces the edge GVL2*h* of the light guide LGUh.

Each of the light guide LGUh and the light guide LGUm has a cross-sectional shape of a trapezoid in which the lower edge is shorter than the upper edge. Each of the light guide LGUh and the light guide LGUm has a cross-sectional shape of a trapezoid in which the upper edge is shorter than the lower edge.

Figure 5:
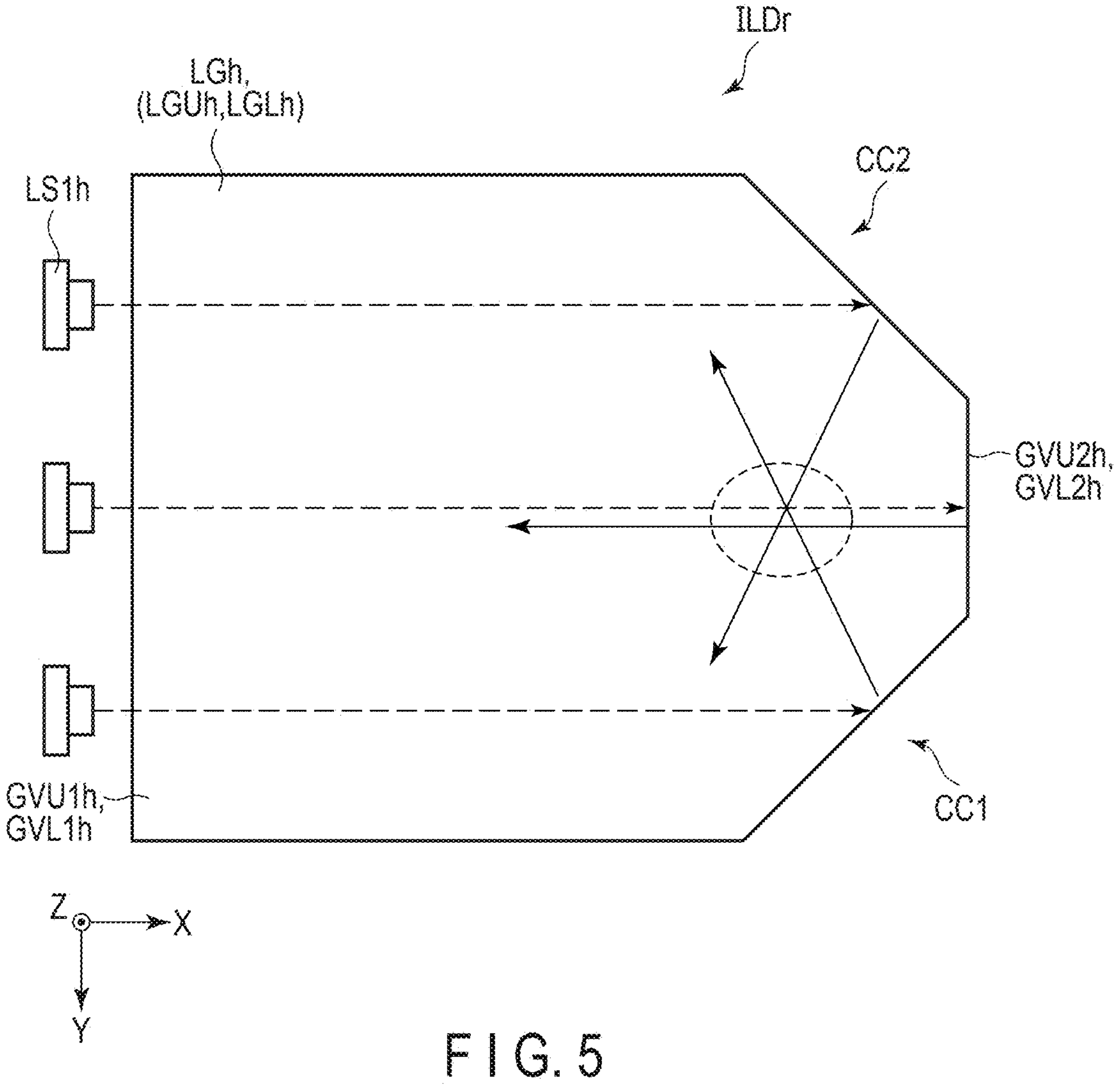
FIG. 5 is a plan view schematically showing a configuration of an illumination device of a comparative example.

FIG. 5 is a plan view showing the configuration of the illumination device of the comparative example. The light guide LGh of the illumination device ILDr has a cut-out corner. The cutout corner is made on the side opposite to the edge where the light source element LS1*h* is mounted, namely, on the side of the edge GVU2*h* and the edge GVL2*h*.

In the example shown in FIG. 5, of the cutout corners, the one located on the lower side of the page is designated as a corner CC1. Of the cutout corners, the one located on the upper side of the paper is designated as a corner CC2.

Light emitted from the light source element LS1*h* enters the light guide LGUh from the edge GVU1*h* and progress in the light guide LGUh along the first direction X. The light having reached the edge GVU2*h* is reflected downward and enters the light guide LGLh. The light then is reflected at the edge GVL2*h* of the light guide LGLh and progresses in the light guide LGLh in a direction opposite to the first direction X.

Here, note that, of the light entering the light guide LGLh, the light reflected at the corner CC1 and the corner CC2 progresses in the light guide LGLh at an angle tilted from the direction parallel to the first direction X. As a result, the light reflected at the corner CC1 and the light reflected at the corner CC2 converge near the center of the light guide LGLh.

Incidentally, on the lower surface of the light guide LGLh, multiple protruding portions (which may as well be referred to as ridges and grooves or prisms) are provided. The lower surface of the light guide LGLh is the surface facing the reflector REFh.

When the light emitted from the light source element LS1*h* is reflected at the edge GVU2*h* and the edge GVL2*h*, the polarization direction of that light remains unchanged. This polarization direction is parallel to the first direction X. But, the polarization direction of the light reflected at the corner CC1 and the corner CC2 changes to a direction tilted from the first direction X. With this configuration, the amount of light having a polarization direction parallel to the first direction X may be reduced, which is undesirable.

For the reasons provided above, in the illumination device ILDr, the luminance distribution of the light emitted from the illumination device ILDr may become non-uniform, which is undesirable.

In the embodiment, the corners of the light guide are formed in a stepped fashion. Further, the corners of the reflector, which correspond to the corners of the light guide, are also formed in a stepped fashion. With this configuration, the luminance distribution of the light emitted from the illumination device can be made uniform.

By achieving uniformity in the luminance distribution of the light emitted from the illumination device, it is possible to achieve uniformity in the luminance distribution of the image light obtained by modulating the emitted light using the display panel.

Figure 6:
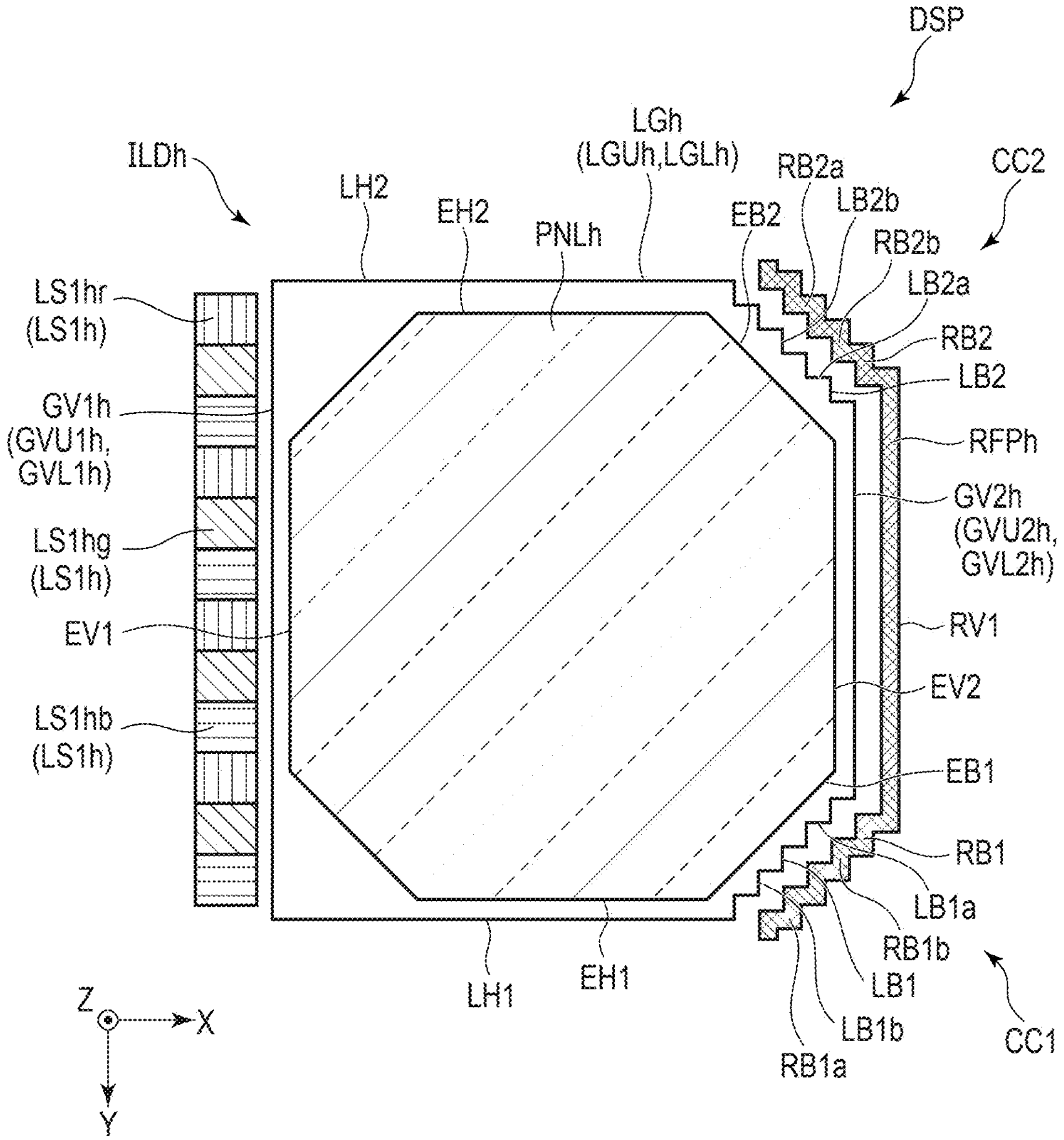
FIG. 6 is a plan view schematically showing an example of a configuration of the display device.

FIG. 6 is a plan view schematically showing an example of a configuration of a display device. The example shown in FIG. 6 illustrates a display panel PNLh and an illumination device ILDh for the left eye. The display panel and the illumination device for the right eye have configurations similar with those of the display panel PNLh and illumination device ILDh, respectively, except that they have a shape that is line-symmetric with respect to the second direction Y as its axis. Therefore, for the description of the display panel and the illumination device for the right eye is omitted, the description of the display panel PNLh and the illumination device ILDh for the left eye should be referred to, and it will be omitted.

The display panel PNLh shown in FIG. 6 has a configuration similar with that of the display panel PNLh described with reference to FIG. 2. Of the edges of the display panel PNLh, those extending in a direction parallel to the first direction X are designated as an edge EH1 and an edge EH2. Of the edges of the display panel PNLh, those extending parallel to the second direction Y are designated as an edge EV1 and an edge EV2.

The edge provided between the edge EH1 and edge EV2 and extending in a direction making an acute angle with the first direction X is designated as an edge EB1. The edge provided between the edge EH2 and the edge EV2 and extending in a direction making an acute angle with the first direction X is designated as an edge EB2.

The illumination device ILDh, as shown in FIGS. 3 and 4, includes a light guide LGUh and a light guide LGLh. As described above, the light guide LGLh and the light guide LGUh constitute the light guide LGh. Of the edges of the light guide LGh, those extending in a direction parallel to the first direction X are designated as an edge LH1 and an edge LH2.

The edge GVU1*h* of the light guide LGUh and the edge GVL1*h* of the light guide GLUh are collectively defined as an edge GV1*h* of the light guide LGh. The edge GVU2*h* of the light guide LGUh and the edge GVL2*h* of the light guide LGLh are collectively defined as an edge GV2*h* of the light guide LGh.

At the corner CC1 of the light guide LGh, edges LB1*a* extending in a direction parallel to the first direction X and edges LB1*b* extending in a direction parallel to the second direction Y are provided. The multiple edges LB1*a* and multiple edges LB1*b* are connected alternately with each other to form a stepped edge LB1.

At the corner CC2 of the light guide LGh, edges LB2*a* extending parallel to the first direction X and edges LB2*b* extending parallel to the second direction Y are provided. The multiple edges LB2*a* and edges LB2*b* are connected alternately with each other, to form a stepped edge LB2.

To distinguish these edges from others, the edges LB1*a*, the edges LB1*b*, the edges LB2*a*, and the edges LB2*b* may as well be referred to as short edges is some cases.

Along the edge LB1, the edge GV2*h*, and the edge LB2 of the light guide LGh, a reflector RFPh is provided. The reflector RFPh has a portion RB1, the portion RV1, and the portion RB2 extending along the edge LB1, the edge GV2*h*, and the edge LB2, respectively.

The portion RB1 includes portions RB1*a* extending in a direction parallel to the first direction X and portions RB1*b* extending in a direction parallel to the second direction Y. The multiple portions RB1*a* and the multiple parts RB1*b* are connected alternately with each other to form a stepped portion RB1.

The portion RB2 includes portions RB2*a* extending in a direction parallel to the first direction X and portions RB2*b* extending in a direction parallel to the second direction Y. The multiple portions RB2*a* and multiple portions RB2*b* are connected alternately with each other to form a stepped portion RB2.

It can be said that the portions RB1*a* and the portions RB2*a* of the reflector RFPh are segments arranged parallel along the first direction X. It can be said that the portions RB1*b* and portions the RB2*b* of the reflector RFPh are segments arranged parallel along the second direction Y.

The portions RB1*a* face the edges LB1*a*, respectively, along the second direction Y. The portions RB1*b* face the edged LB1*b*, respectively, along the first direction X.

The portions RB2*a* face the edges LB2*a*, respectively, along the second direction Y. The portions RB2*b* face the edges LB2*b*, respectively, along the first direction X.

The multiple light source elements LS1*h* are provided to face the edge GV1*h* of the light guide LGh. The light source elements LS1*h* include a light source element LS1*hr* that emits red (R) light, a light source element LS1*hg* that emits green (G) light, and a light source element LS1*hb* that emits blue (B) light.

Figure 7:
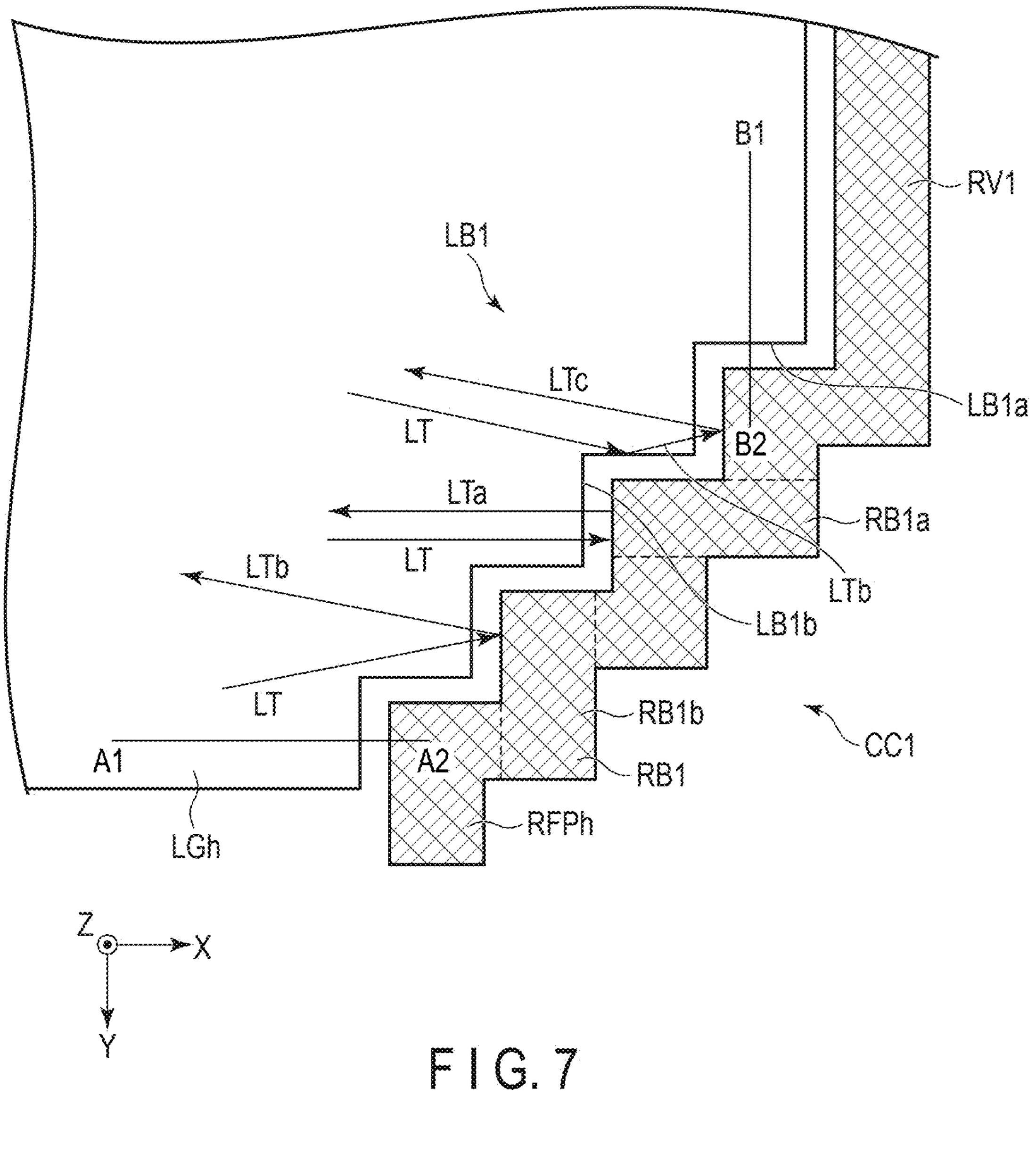
FIG. 7 is a partially enlarged view of FIG. 6.

FIG. 7 is a partially enlarged view of FIG. 6. Light which emitted from the light source elements LS1*h* and enters the light guide LGh is designated as light LT. The light LT propagating along the first direction X is reflected by the portion RB1*b*. The reflected light is designated as light LTa. The reflected light LTa also propagates in a direction opposite to the first direction X. Here, the light LTa propagates in the opposite direction to the first direction X, and therefore the light LT and the light LTa do not intersect and thus the light LTa does not converge. Further, the polarization direction of the light LTa does not change.

Further, when the light LT propagates in the light guide LGh at an angle slightly inclined relative to the first direction X, it is emitted from the edge LB1*b* of the light guide LGh toward the reflector RFPh at that angle. The emitted light LT is reflected at the portion RB1*b* and re-enters the light guide LGh. This re-entering light is designated as light LTb.

Further, when the light LT propagates in the light guide LGh at an angle slightly inclined relative to the first direction X, it may reach the edge LB1*a* before reaching the edge LB1*b* of the light guide LGh. In this case, the light LT undergoes total internal reflection at the edge LB1*a* of the light guide LGh. After the total internal reflection, the light LT is emitted at an angle from the edge LB1*b* of the light guide LGh toward the reflector RFPh. The emitted light LTb is reflected by the portion RB1*b* and re-enters the light guide LGh. This re-entering light to the light guide LGh is designated as light LTc.

The portion RB1*b* extends in a direction parallel to the second direction Y, as in a similar fashion to that of the portion RV1. The light LTa, the light LTb, and the light LTc reflected by the portion RB1*b* each have a main optical path that is approximately parallel to the first direction X.

FIG. 7 illustrates the reflection of the light LT at the corner CC1, but a similar reflection occurs at the corner CC2 as well. Consequently, the light reflected at both the corner CC1 and the corner CC2 does not converge near the center of the light guide LGh.

Further, the main optical paths of the light LTa, the light Ltb, and the light Ltc are approximately parallel to the first direction X. With this configuration, the polarization direction of the light does not change between before and after the reflection at the reflector RFPh.

Figure 8:
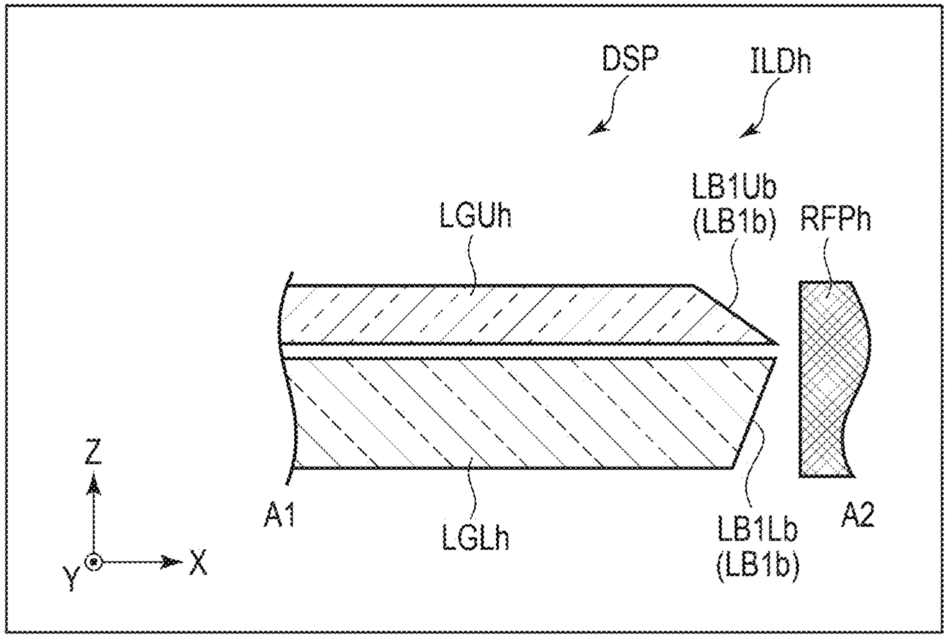
FIG. 8 is a cross-sectional view of the display device taken along the line A1-A2 in FIG. 7.
Figure 9:
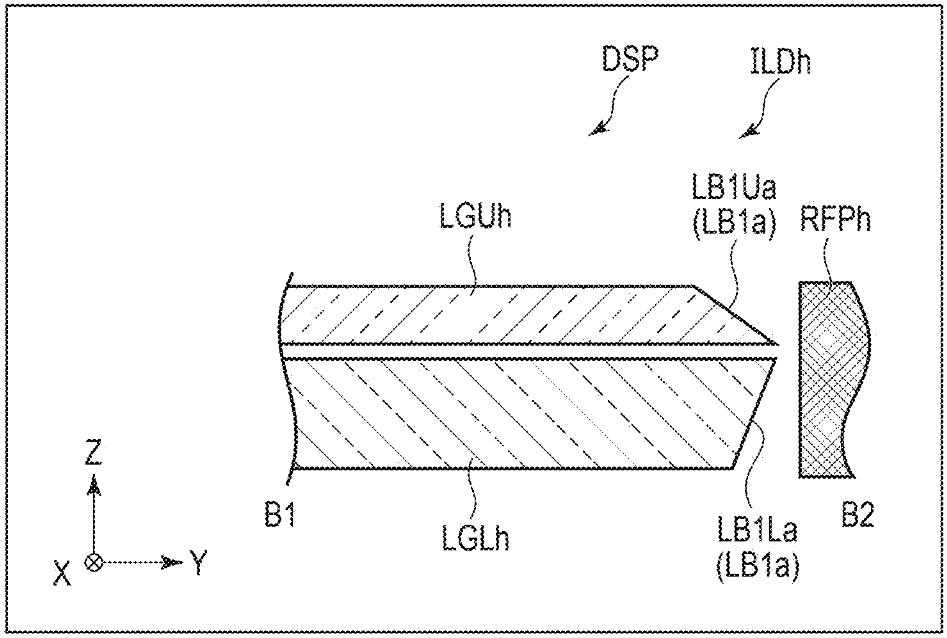
FIG. 9 is a cross-sectional view of the display device taken along the line B1-B2 in FIG. 7.

FIG. 8 is a cross-sectional view of the display device taken along the line A1-A2 in FIG. 7. FIG. 9 is a cross-sectional view of the display device taken along the line B1-B2 in FIG. 7. It can also be said that FIG. 8 is a cross-sectional view of the light guide LGh including the edge LB1*b*. It can also be said that FIG. 9 is a cross-sectional view of the light guide LGh including the edge LB1*a*. FIGS. 8 and 9 show only the light guide LGUh, the light guide LGLh, and the reflector RFPh.

As shown in FIG. 8, the edge of the light guide LGUh, which corresponds to the edge LB1*b* of the light guide LGh, is designated as an edge LB1Ub. The edge of the light guide LGLh, which corresponds to the edge LB1*b* of the light guide LGh, is designated as an edge LB1Lb.

In a similar fashion to that of the edge GVU2*h* of the light guide LGUh, the edge LB1Ub of the light guide LGUh extends at an angle relative to the third direction Z. In a similar fashion to that of the edge GVL2*h* of the light guide LGLh, the edge LB1Lb of the light guide LGLh extends at an angle relative to the third direction Z. That is, it can be said that the edge LB1Ub of the light guide LGUh shown in FIG. 8 has a cross-sectional shape which is a part of a trapezoid in which a lower base thereof is longer than an upper base. Further, it can be said that the edge LB1Lb of the light guide LGUh shown in FIG. 8 has a cross-sectional shape that is a part of a trapezoid in which a lower base thereof is shorter than an upper base.

As shown in FIG. 9, the edge of the light guide LGUh, which corresponds to the edge LB1*a* of the light guide LGh, is designated as an edge LB1Ua. The edge of the light guide LGLh, which corresponds to the edge LB1*a* of the light guide LGh, is designated as an edge LB1La.

The edge LB1Ua of the light guide LGUh extends at an angle relative to the third direction Z. The edge LB1La of the light guide LGLh extends at an angle relative to the third direction Z. That is, it can be said that the edge LB1Ua of the light guide LGUh shown in FIG. 9 has a cross-sectional shape, which is a part of a trapezoid in which a lower base thereof is longer than an upper base. Further, it can be said that the edge LB1La of the light guide LGLh shown in FIG. 9 has a cross-sectional shape which is a part of a trapezoid in which a lower base thereof is shorter than an upper base.

In the illumination device ILDh of the above-provided embodiment, and in the illumination device ILDm having a shape line-symmetrical to that of the illumination device ILDh, the luminance distribution of the light emitted from the illumination device can be made uniform. The image light from the display panel PNLh and the display panel PNLm, illuminated by the illumination device ILDh and illumination device ILDm, respectively, also has a uniform luminance distribution. Thus, according to the embodiment, it is possible to obtain a display device DSP that emits image light having a uniform luminance distribution.

Configuration Example 1

Figure 10:
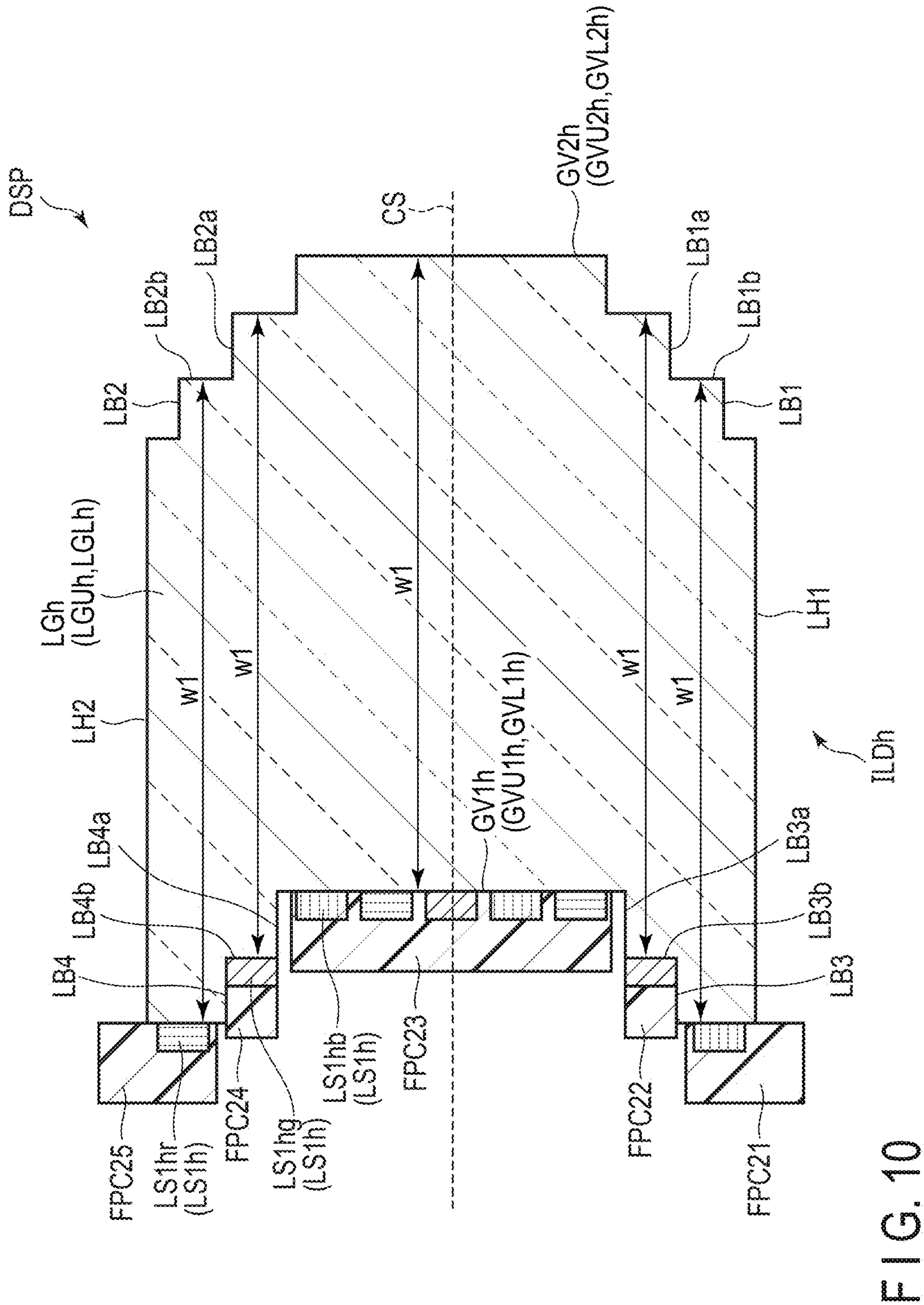
FIG. 10 is a plan view showing another configuration example of the illumination device used in the display device of the embodiment.

FIG. 10 is a plan view showing another configuration example of the illumination device used in the display device of the embodiment. The configuration example shown in FIG. 10 is different compared to the configuration example shown in FIG. 6 in that the corner portion on the side where the light source element is provided also has a stepped shape.

The light guide LGh of the illumination device ILDh shown in FIG. 10 has an edge LB3 between the edge LH1 and edge GV1*h* of the light guide LGh. The edge LB3 includes edges LB3*a* parallel to the first direction X and edges LB3*b* parallel to the second direction Y. The edges LB3*a* and the edges LB3*b* are arranged alternately, to form the stepped edge LB3 as a whole.

The light guide LGh has an edge LB4 between the edge LH2 and the edge GV1*h* of the light guide LGh. The edge LB4 includes edges LB4*a* parallel to the first direction X, and edges LB4*b* parallel to the second direction Y. The edges LB4*a* and the edges LB4*b* are arranged alternately, to form the stepped edge LB4 as a whole.

The edge LB3 faces the edge LB1 along the first direction X. The edge LB4 faces the edge LB2 along the first direction X. The edge LB3 and the edge LB4 are arranged in line-symmetry with respect to the virtual line CS passing through the center of the edge GV2*h* of the light guide LGh.

From the edge LH1 to the edge LH2, the multiple edges LB3*a*, multiple edges LB3*b*, the edge GV1*h*, multiple edges LB4*a*, and multiple edges LB4*b* are provided along the second direction Y. From the edge LH1 to the edge LH2, the flexible printed circuit boards FPC21, FPC22, FPC23, FPC24, and FPC25 are provided from the lower side to the upper side of the page.

The light source elements LS1*h* (light source elements LS1*hr*, LS1*hg*, and LS1*hb*) provided adjacent to the edges LB3 and LB4, respectively, are arranged in a stepped configuration. The flexible printed circuit boards FPC21 to FPC25, adjacent to the edges LB3 and LB4 respectively, are arranged in a stepped configuration.

The light source element LS1*hb* is provided near the edge LB3*b* connected to the edge LH1. The light source element LS1*hb* is connected to the flexible printed circuit board FPC21, which is provided adjacent to the edge LB3*b*.

The light source element LS1*hg* is provided adjacent to the above-described light source element LS1*hb* along the second direction Y. The light source element LS1*hg* is provided adjacent to another edge, that is, the edge LB3*b*. The light source element LS1*hg* is connected to the flexible printed circuit board FPC22 provided adjacent to the edge LB3*b*.

The light source element LS1*hr* is provided adjacent to the edge LB4*b*, which is connected to the edge LH2. The light source element LS1*hr* is connected to the flexible printed circuit board FPC25, which is provided adjacent to the edge LB4*b*.

The above-described light source element LS1*hr* is provided adjacent the light source element LS1*hg* along a direction opposite to the second direction Y. The light source element LS1*hg* is provided adjacent to another edge, that is, the edge LB4*b*. The light source element LS1*hg* is connected to the flexible printed circuit board FPC24, which is provided adjacent to the edge LB4*b*.

The light source elements LS1*hb*, LS1*hr*, LS1*hg*, LS1*hb*, and LS1*hr* are provided adjacent to the edge GV1*h*. The light source elements LS1*hb*, LS1*hr*, LS1*hg*, LS1*hb*, and LS1*hr*, which are adjacent to the edge GV1*h*, are connected to the flexible printed circuit board FPC23.

It is preferable that the distance between the edge LB1*b* and the edge LB3*b*, the distance between the edge GV1*h* and the edge GV2*h*, and the distance between the edge LB2*b* and the edge LB4*b*, which are along the first direction X, should be all the same as each other. These distances are designated as a length w1.

By setting the distance between the edge LB1*b* and the edge LB3*b*, the distance between the edge GV1*h* and the edge GV2*h*, and the distance between the edge LB2*b* and the edge LB4*b* to be all the same length w1, it is possible to make the pattern provided on the light guide LGH uniform.

In this disclosure, the edge GVL1*h* may as well be referred to as a first edge, the edge GVL2*h* as a second edge, the edge LH1 of the light guide LGLh as a third edge, and the edge LH2 of the light guide LGLh as a fourth edge. The edge GVU1*h* may as well be referred to as a fifth edge, the edge GVU2*h* as a sixth edge, the edge LH1 of the light guide LGUh as a seventh edge, and the edge LH2 of the light guide LGUh as an eighth edge.

The edge LB1*a* may as well be referred to as a first short edge, the edge LB1*b* as a second short edge, the edge LB2*a* as a third short edge, and the edge LB2*b* as a fourth short edge. The portion RB1*a* may as well be referred to as a first segment, the portion RB1*b* as a second segment, the portion RB2*a* as a third segment, and the portion RB2*b* as a fourth segment.

However, the ordinal numbers assigned to the edges and segments are not limited to those listed above. Different ordinal numbers may be assigned thereto as necessary. Other components may as well be represented by assigning ordinal numbers as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:

an illumination device; and a display panel provided on the illumination device, wherein the illumination device comprises:

a first light guide having a rectangular shape extending along a first direction and a second direction intersecting the first direction, in which corners thereof are cut out, and including a first edge and a second edge extending along the second direction, and a third edge and a fourth edge extending along the first direction;

a second light guide disposed on the first light guide, having a rectangular shape extending along the first direction and the second direction in which corners are cut out, and having a fifth edge and a sixth edge extending along the second direction, and a seventh edge and an eighth edge extending along the first direction;

a plurality of light source elements disposed to face the fifth edge of the second light guide;

a first reflector disposed below the first light guide;

an optical sheet disposed on the second light guide; and a second reflector disposed to face the second edge of the first light guide and the sixth edge of the second light guide, wherein the first light guide has a cross-sectional shape of a first trapezoid in which a lower edge thereof is shorter than an upper edge, the second light guide has a cross-sectional shape of a second trapezoid in which an upper edge thereof is shorter than a lower edge, the first light guide and the second light guide respectively include first short edges each extending in the first direction and second short edges each extending in the second direction, which are arranged alternately with each other, between the third edge and the second edge of the first light guide and between the seventh edge and the sixth edge of the second light guide, the first light guide and the second light guide respectively include third short edges extending in the first direction and fourth short edges extending in the second direction, which are arranged alternately with each other, between the fourth edge and the second edge of the first light guide and between the eighth edge and the sixth edge of the second light guide, the second reflector include first segments each extending in the first direction and second segments each extending in the second direction, which are arranged alternately with each other, and third segments each extending in the first direction and fourth segments each extending in the second direction, which are arranged alternately with each other, the first segments face the first short edges, the second segments face the second short edges, and the third segments face the third short edges, and the fourth segments face the second short edges.

2. The display device according to claim 1, wherein the plurality of light source elements are each a laser light source which emits laser light.

3. The display device according to claim 1, wherein the display panel is a liquid crystal display panel.

4. The display device according to claim 1, wherein the display panel is designated as a first display panel, and the illumination device is designated as a first illumination device, and the display device comprises:

a second display panel having a shape line symmetrical to the first display panel with respect to the second direction as an axis, and a second illumination device having a shape line-symmetrical to the first illumination device with respect to the second direction as an axis.

* * * * *